US012612010B2

(12) United States Patent
Faruque et al.

(10) Patent No.: US 12,612,010 B2
(45) Date of Patent: Apr. 28, 2026

(54) LOAD LIMITING SEATBELT RETRACTOR

(71) Applicant: Ford Global Technologies, LLC, Dearborn, MI (US)

(72) Inventors: Mohammad Omar Faruque, Ann Arbor, MI (US); Dean M. Jaradi, Macomb, MI (US); S.M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 244 days.

(21) Appl. No.: 18/529,433

(22) Filed: Dec. 5, 2023

(65) Prior Publication Data

US 2025/0178561 A1     Jun. 5, 2025

(51) Int. Cl.
B60R 22/36 (2006.01)

(52) U.S. Cl.
CPC .................................... B60R 22/36 (2013.01)

(58) Field of Classification Search
CPC .............................. B60R 22/36; B60R 22/343
See application file for complete search history.

(56) References Cited

U.S. PATENT DOCUMENTS

| | | | |
|---|---|---|---|
| 7,478,836 B2 | 1/2009 | Lenning | |
| 9,650,015 B2 | 5/2017 | Specht et al. | |
| 10,005,424 B2 | 6/2018 | Osaki et al. | |
| 10,377,340 B2 * | 8/2019 | Jaradi ................... | B60R 22/343 |
| 11,577,685 B2 | 2/2023 | van Poppel | |
| 2024/0383436 A1 * | 11/2024 | Faruque .............. | B60R 22/3413 |
| 2025/0083634 A1 * | 3/2025 | Faruque .............. | B60R 22/3413 |

FOREIGN PATENT DOCUMENTS

| | | |
|---|---|---|
| CN | 112389363 B | 3/2022 |
| JP | 2013249030 A | 12/2013 |
| KP | 20120025049 A | 3/2012 |

* cited by examiner

*Primary Examiner* — Sang K Kim
(74) *Attorney, Agent, or Firm* — Frank A. MacKenzie; Brooks Kushman P.C.

(57)     ABSTRACT

A seatbelt retractor includes a frame and a spool rotatably supported by the frame. The spool has a rotational axis. The seatbelt retractor includes a ring selectively lockable with the spool. The seatbelt retractor includes a locking device operatively coupled between the spool and the ring to rotationally engage the spool with the ring in a locked position and rotationally disengage the spool from the ring in an unlocked position. The seatbelt retractor includes a linear actuator having a base and a pin. The base is fixed relative to the frame and the pin being moveable relative to the base and the frame toward and away from the ring along the rotational axis.

17 Claims, 7 Drawing Sheets

LOAD LIMITING SEATBELT RETRACTOR

BACKGROUND

A seatbelt in a vehicle may be equipped with load-limiting features. During certain vehicle impacts, a seatbelt retractor of the seatbelt may lock webbing of the seatbelt from further extension from the seatbelt retractor, and load-limiting features may permit some additional limited extension of the webbing when the force exerted on the webbing exceeds a load-limiting threshold. This additional extension of the webbing from the seatbelt retractor limits the load applied by the webbing to the chest of an occupant, which may limit chest compression. As an example, the load-limiting features may include a torsion bar disposed within a spool of the seatbelt retractor.

DETAILED DESCRIPTION

Figure 1:
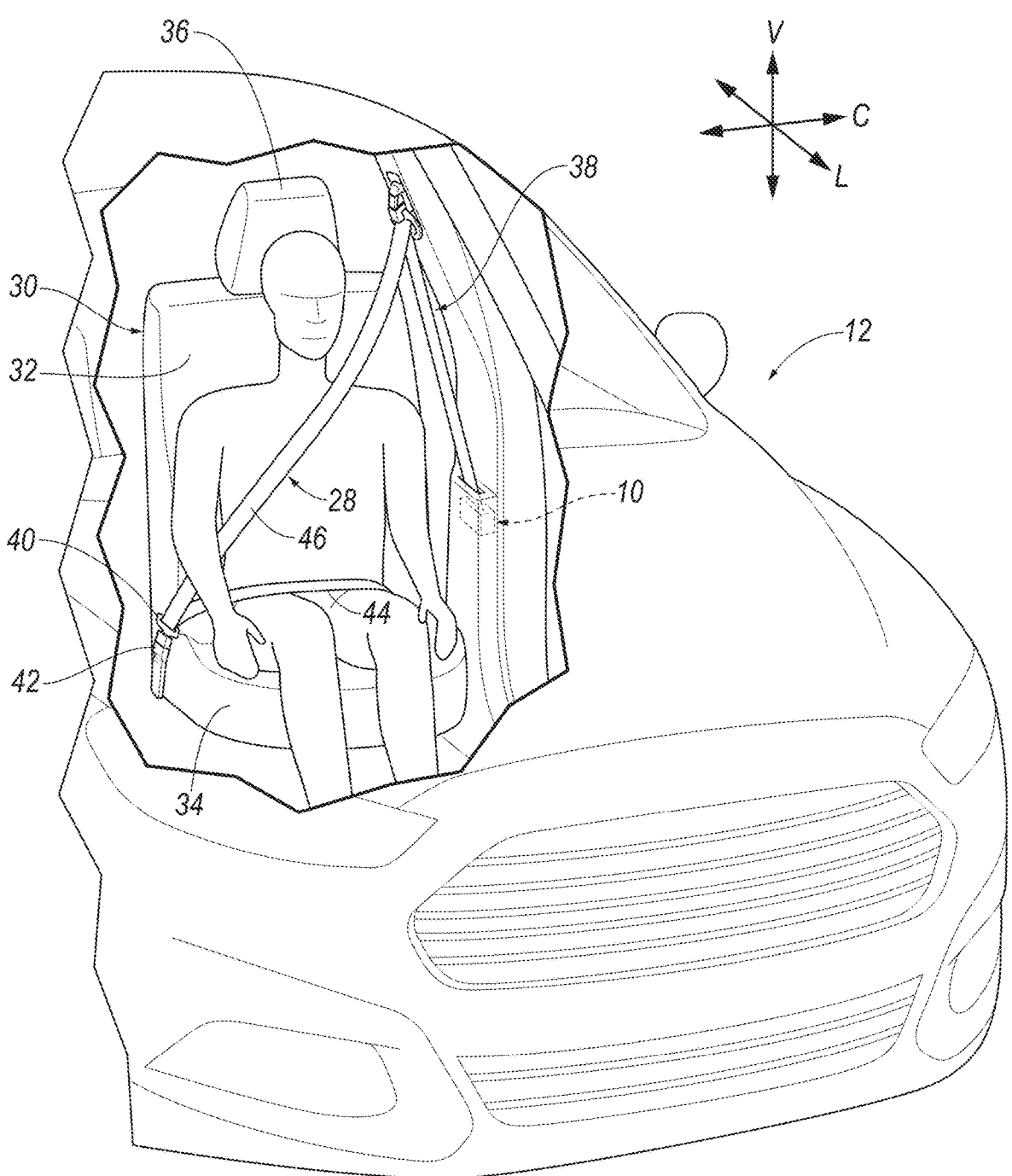
FIG. 1 is a cut-away view of a vehicle to show a seat and a seatbelt assembly.

A seatbelt retractor includes a frame and a spool rotatably supported by the frame. The spool has a rotational axis. The seatbelt retractor includes a ring selectively lockable with the spool. The seatbelt retractor includes a locking device operatively coupled between the spool and the ring to rotationally engage the spool with the ring in a locked position and rotationally disengage the spool from the ring in an unlocked position. The seatbelt retractor includes a linear actuator having a base and a pin. The base is fixed relative to the frame and the pin being moveable relative to the base and the frame toward and away from the ring along the rotational axis.

The seatbelt retractor may include a friction pad aligned with the ring. The friction pad may be between the ring and the frame.

The friction pad may abut the frame and the friction pad abuts the ring.

The ring may include a top surface facing away from frame and the ring may include a bottom surface facing toward the frame. The linear actuator may be adjacent the top surface and the friction pad may be adjacent the bottom surface between the bottom surface and the frame.

The seatbelt retractor may include a second linear actuator having a base and a pin. The base of the second linear actuator may be fixed relative to the frame and the pin of the second linear actuator may be moveable relative to the base and the frame toward and away from the ring along the rotational axis.

The frame may include a member. The linear actuator and the second linear actuator may be spaced from each other along the member.

The pin of the linear actuator and the pin of the second linear actuator may each extend through the member along the rotational axis to the ring.

The ring may be biaseable toward and away from the frame by the pin along the rotational axis.

The frame may include a second ring coaxial with the spool on the rotational axis. The second ring may extend annularly about the ring.

The frame may include a member fixed to the second ring. The linear actuator may be fixed relative to the member between the member and the ring.

The frame may include a member. The linear actuator may be fixed relative to the member between the member and the ring.

The pin of the linear actuator may each extend through the member along the rotational axis to the ring.

The ring may include an inner surface extending annularly around the rotational axis and an outer surface may extend annularly about the inner surface and the locking device may engage the inner surface.

The inner surface may include teeth and the locking device may include teeth. The teeth of the locking device may be engaged with the teeth of the inner surface in the locked position and may be disengaged with the teeth of the inner surface in the unlocked position.

The locking device may be a centrifugal clutch.

The locking device may include an inertia clutch.

The locking device may directly engage the ring in the locked position.

With reference to the Figures, wherein like numerals indicate like parts throughout the several views, a seatbelt retractor 10 for a vehicle 12 includes a frame 14 and a spool 16 rotatably supported by the frame 14. The spool 16 has a rotational axis A. The seatbelt retractor 10 includes a ring 18 selectively lockable with the spool 16. The seatbelt retractor 10 includes a locking device 20 operatively coupled between the spool 16 and the ring 18 to rotationally engage the spool 16 with the ring 18 in a locked position and rotationally disengage the spool 16 from the ring 18 in an unlocked position. The seatbelt retractor 10 includes a linear actuator 22 having a base 24 and a pin 26. The base 24 is fixed relative to the frame 14 and the pin 26 being moveable relative to the base 24 and the frame 14 toward and away from the ring 18 along the rotational axis A.

In the event of sudden deceleration of the vehicle 12, the locking device 20 may engage the spool 16 with the ring 18 in the locked position. The linear actuators 22 may apply a force axially along the rotational axis A to bias the ring 18 toward or away from the frame 14 to apply pressure to the ring 18 that creates a friction force against the frame 14. The friction force allows for constant or variable friction loading against the frame 14 to limit loads on an occupant of the vehicle 12. Payout of a seatbelt webbing 28 may be adjusted based on the amount of pressure and friction between the ring 18 and the frame 14.

With reference to FIG. 1, the vehicle 12 may be any suitable type of ground vehicle, e.g., a passenger or commercial automobile such as a sedan, a coupe, a truck, a sport utility, a crossover, a van, a minivan, a taxi, a bus, etc. Operations, systems, and methods described herein should always be implemented and/or performed in accordance with an applicable owner's/user's manual and/or safety guidelines.

The vehicle 12 defines a vehicle-longitudinal axis L extending between a front end (not numbered) and a rear-end (not numbered) of the vehicle 12. The vehicle 12 defines a cross-vehicle axis C extending cross-vehicle from one side to the other side of the vehicle 12. The vehicle 12 defines a vertical axis V extending through a vehicle floor (not numbered) and ceiling of the vehicle 12. The vehicle-longitudinal axis L, the cross-vehicle axis C, and the vertical axis V are perpendicular relative to each other.

The vehicle 12 includes a vehicle frame (not numbered) and a vehicle body (not numbered). The vehicle frame and/or the vehicle body defines a passenger compartment (not numbered) to house occupants of the vehicle 12. The passenger compartment may extend across the vehicle 12, i.e., from one side to the other side of the vehicle 12. The passenger compartment includes a front and a rear.

The vehicle 12 may include one or more seats 30. Specifically, the vehicle 12 may include any suitable number of seats 30. The seats 30 are supported by the vehicle floor. The seats 30 may be arranged in any suitable arrangement in the passenger compartment. As in the example shown in the Figures, one or more of the seats 30 may be at the front end of the passenger compartment, e.g., a driver seat and/or a passenger seat. In other examples, one or more of the seats 30 may be behind the front end of the passenger compartment, e.g., at the rear end of the passenger compartment. The seats 30 may be movable relative to the vehicle floor to various positions, e.g., movable fore-and-aft and/or cross-vehicle. The seat 30 may be of any suitable type, e.g., a bucket seat.

The seats 30 include a seatback 32, a seat bottom 34, and a head restraint 36. The head restraint 36 may be supported by and extend upwardly from the seatback 32. The head restraint 36 may be stationary or movable relative to the seatback 32. The seatback 32 may be supported by the seat bottom 34 and may be stationary or movable relative to the seat bottom 34. The seatback 32, the seat bottom 34, and the head restraint 36 may be adjustable in multiple degrees of freedom. Specifically, the seatback 32, the seat bottom 34, and the head restraint 36 may themselves be adjustable. In other words, adjustable components within the seatback 32, the seat bottom 34, and the head restraint 36 may be adjustable relative to each other.

With continued reference to FIG. 1, the vehicle 12 includes one or more seatbelt assemblies 38. Specifically, one or more of the seatbelt assemblies 38 includes the seatbelt retractor 10, the webbing 28, a latch plate 40, and a seatbelt buckle 42. The webbing 28 is retractably payable from the seatbelt retractor 10. The seatbelt assembly 38 may include an anchor (not shown) fixed relative to the seat 30. In some examples, the anchor may be fixed to the seat, e.g., the seat bottom 34. In other examples, the anchor may be fixed to other components of the vehicle 12, e.g., the vehicle floor, the pillars, etc. The webbing 28 may extend continuously from the seatbelt retractor 10 to the anchor. One end of the webbing 28 may feed into the seatbelt retractor 10 and the other end is fixed to the anchor. The webbing 28 may be fabric, e.g., polyester.

The latch plate 40 is engageable with the seatbelt buckle 42. In other words, the webbing 28 is engageable with the seatbelt buckle 42 by the latch plate 40. The seatbelt buckle 42 is supported by the seat 30. The latch plate 40 slides freely along the webbing 28 and, when in the belted position, divides the webbing 28 into a lap band 44 and a shoulder band 46. The latch plate 40 may be moveable from an unbelted position to a belted position. In other words, the latch plate 40 may be engaged with the seatbelt buckle 42 in the belted position and the latch plate 40 may be disengaged with the seatbelt buckle 42 in the unbelted position.

The seatbelt assembly 38, when in the belted position, is designed to control the kinematics of the occupant during certain vehicle impacts or sudden decelerations of the vehicle 12. The vehicle 12 may include any suitable number of seatbelt assemblies 38, for example, one seatbelt assembly 38 for each seat 30. In the example shown in the Figures, one seat 30 at a front-left position is shown to include the seatbelt assembly 38, and any seat 30 in any position in the passenger compartment may include the seatbelt assembly 38.

Figure 2:
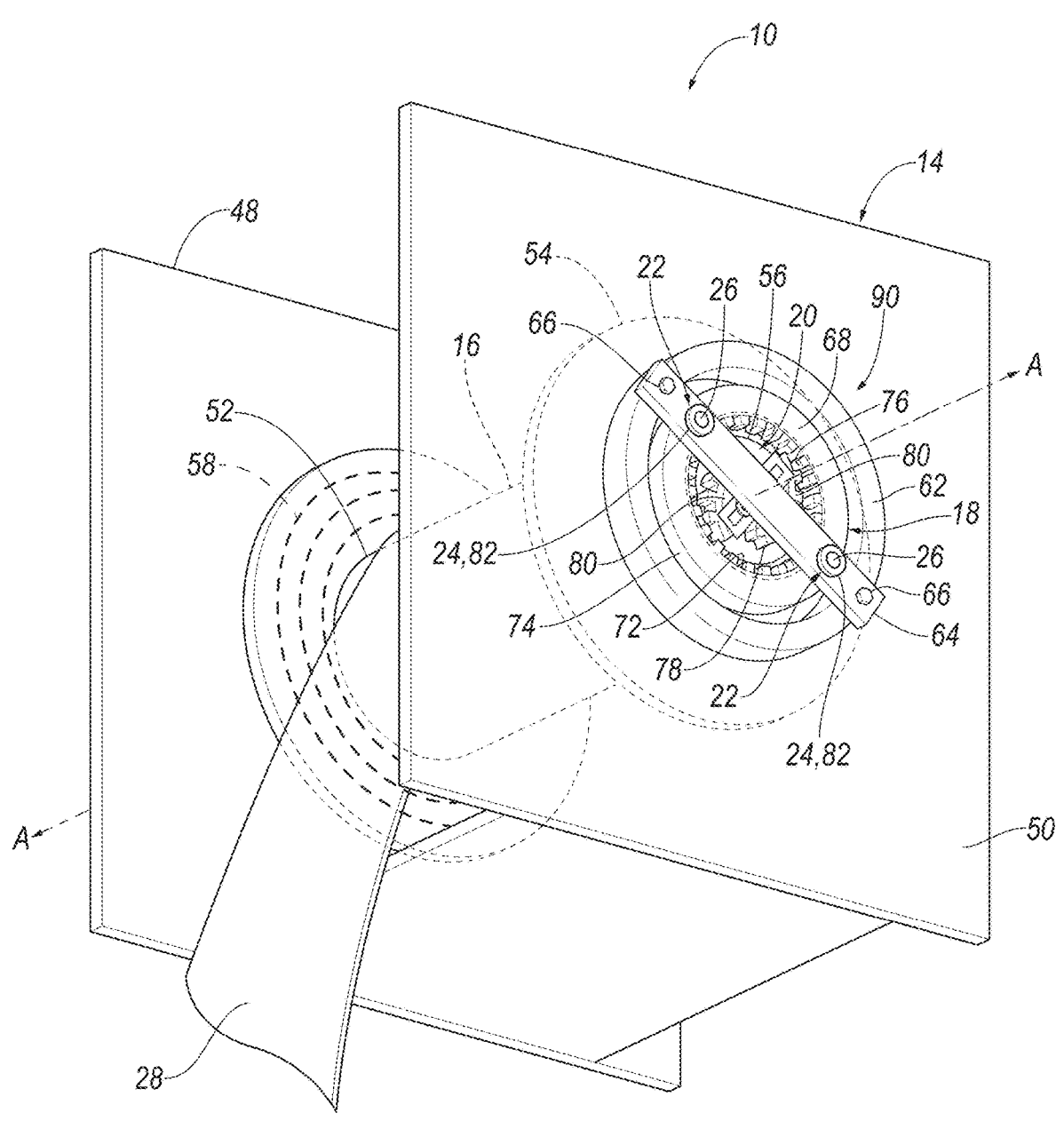
FIG. 2 is a perspective view of a seatbelt retractor of the seatbelt assembly.

With reference to FIG. 2, the seatbelt retractor 10 provides payout and retraction of the webbing 28, e.g., via rotation of the spool 16. As described above, the seatbelt retractor 10 includes the frame 14. The frame 14 supports other components of the seatbelt retractor 10. The frame 14 may include a first plate 48 and a second plate 50 spaced from each other. The frame 14 may be of any suitable size and shape. The frame 14 may be of any suitable material, e.g., plastic, metal, composite, etc. The seatbelt retractor 10 may be supported at any suitable location in the vehicle 12, e.g., the vehicle floor, pillars, etc.

The spool 16 is rotatably supported by the frame 14. For example, a first end 52 of the spool 16 is rotatably supported by the frame 14, e.g., the first plate 48, and a second end 54 of the spool 16 is rotatably supported by the frame 14, e.g., the second plate 50. The spool 16 may be rotatably connected to the frame 14, e.g., the first plate 48 and the second plate 50, in any suitable fashion such that the spool 16 is rotatable relative to the frame 14 about the rotational axis A and otherwise fixed relative to the frame 14. The spool 16 is elongated along and rotatable about a rotational axis A. For example, the first end 52 of the spool 16 may be supported in an opening (not shown) defined by the first plate 48 and the second end 54 may be supported in an opening 56 defined by the second plate 50 (FIGS. 2-4 and 6). The first plate 48 and the second plate 50 are spaced from each other along the rotational axis A.

The spool 16 may include a cylinder and two flanges (not numbered). The flanges of the spool 16 may be between the first plate 48 and the second plate 50, as shown in the example in the Figures (e.g., FIG. 2). The cylinder of the spool 16 may be elongated along the rotational axis A between the first end 52 and the second end 54. As an example, shown in the Figures, the spool 16 includes one flange at the first end 52 of the spool 16 and the other flange at the second end 54 of the spool 16. In the example shown in the Figures, the cylinder is elongated from one flange to the other flange of the spool 16. The flanges of the spool 16 maintain the position of the webbing 28 relative to the spool 16, i.e., the webbing 28 is between the flanges. As shown in the Figures, the flanges extend in a direction radially away from the rotational axis A.

The webbing 28 is supported by the spool 16. Specifically, the webbing 28 is supported on the cylinder between the two flanges of the spool 16. The cylinder may include a slot (not shown) elongated along the rotational axis A. The slot is sized and shaped to receive the webbing 28. The webbing 28 may be in the slot and wound around the spool 16. The webbing 28 may be, for example, fixed to the spool 16 through the slot. The webbing 28 may be fixed to the spool 16 in any suitable manner.

With continued reference to FIG. 2, the seatbelt retractor 10 includes a return spring 58. The return spring 58 may be supported by the frame 14 and operatively engaged with the spool 16 to apply torque to the spool 16 relative to the frame 14. The return spring 58 may be coupled to the spool 16 and the frame 14. In the example shown in the Figures, the return spring 58 is disposed at the first plate 48 of the frame 14 and is engaged with the first end 52 of the spool 16 to retract the webbing 28, i.e., when the locking device 20 is unlocked. The return spring 58 may be loaded in tension or compression when the webbing 28 is fully retracted, and the return spring 58 may be further loaded in either tension or compression when the webbing 28 is extended from the spool 16. When force is exerted on the webbing 28, the return spring 58 may uncoil and the webbing 28 may payout from the spool 16. When the force applied to the webbing 28 is released, no rotational force is exerted on the spool 16 and the return spring 58 exerts a force tending to retract the webbing 28. The return spring 58 may be, for example, a spiral torsion return spring 58 or any other suitable type of return spring 58.

The seatbelt retractor 10 may be free of having a torsion bar between the spool 16 and the frame 14. In other words, the seatbelt retractor 10 may not include a conventional torsion bar between the locking device 20 and the spool 16.

The seatbelt retractor includes a load limiter 90 between the spool 16 and the frame 14. As described further below, the load limiter 90 includes the ring 18 and at least one linear actuator 22, e.g., two linear actuators 22 in the example shown in the Figures. The load limiter 90 is selectively engageable with the spool 16 by the locking device 20. In other words, the locking device 20 may couple the spool 16 to the load limiter 90 to deliver rotational force of the spool 16 to the load limiter 90. In the event the force delivered to the spool 16 is below a force threshold (described below), the load limiter 90 prevents rotation of the spool 16 relative to the frame 14 to prevent extension of webbing 28 from the seatbelt retractor 10. In the event the force delivered to the spool 16 is above the force threshold, the load limiter 90 allows for a controlled amount of rotation of the spool 16 relative to the frame 14 about the rotational axis A, which pays out a controlled amount of the webbing 28 from the spool 16.

Figure 3:
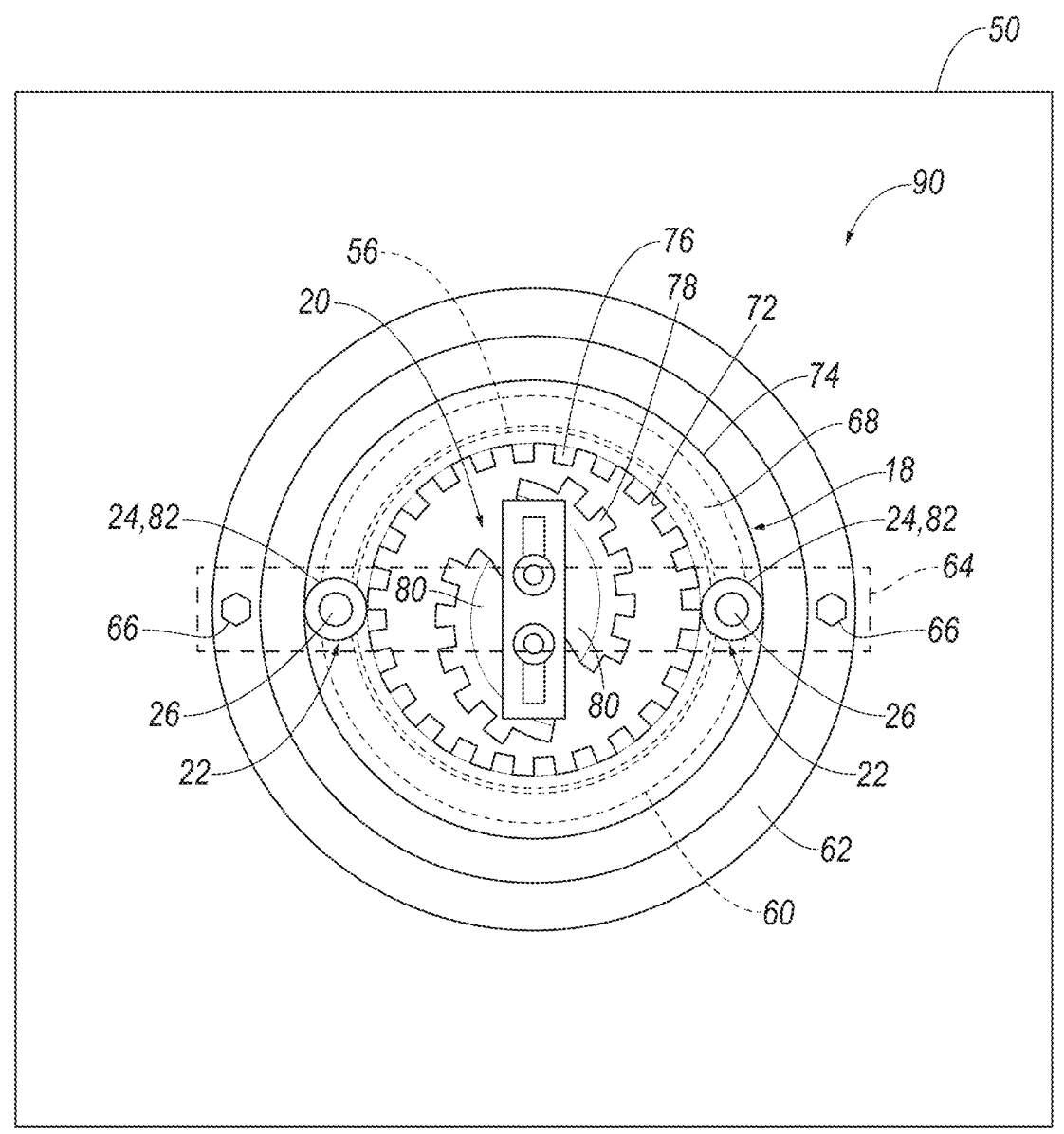
FIG. 3 is an end view of a portion of the seatbelt retractor with a locking device in an unlocked position.
Figure 4:
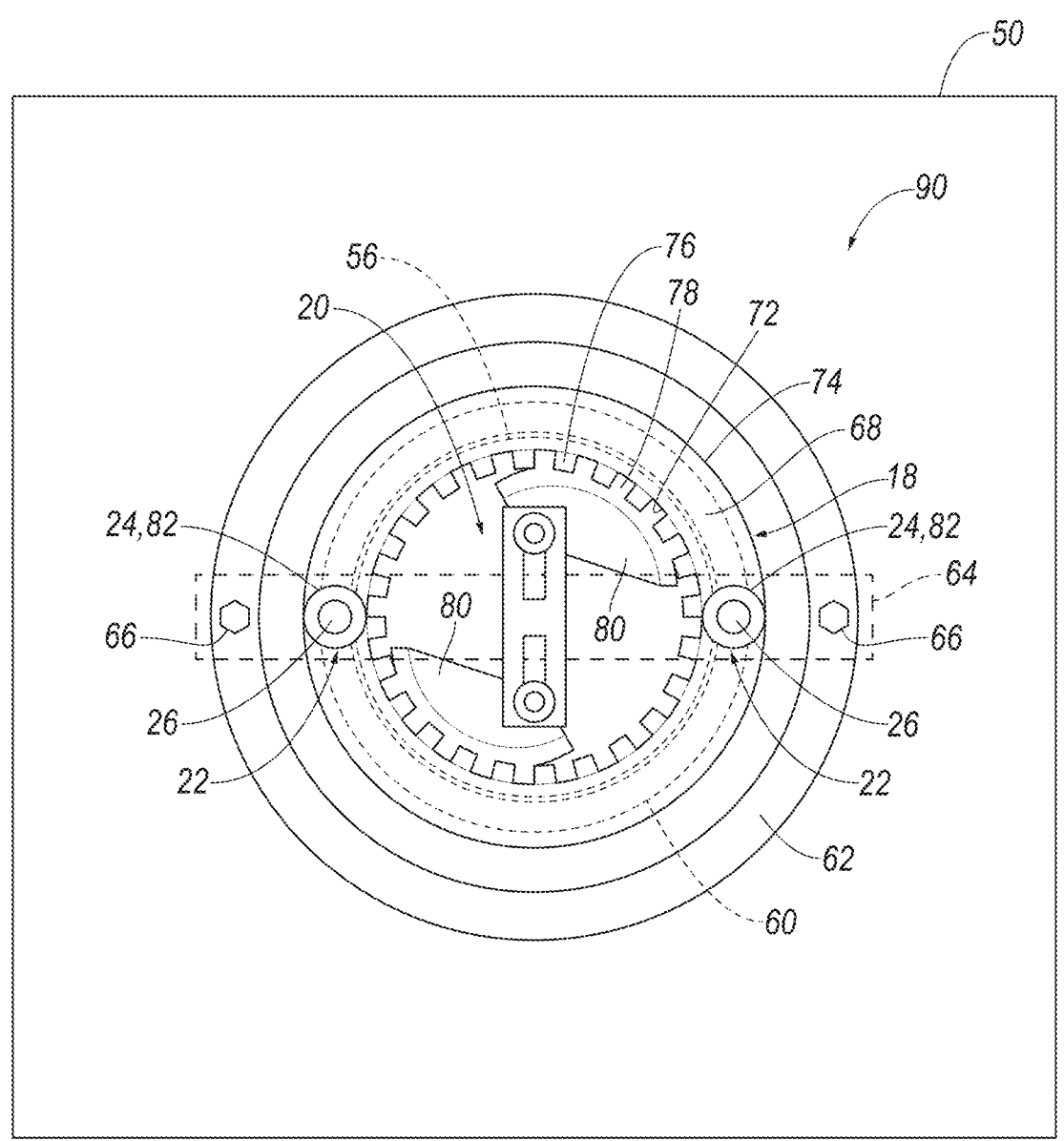
FIG. 4 is an end view of a portion of the seatbelt retractor with a locking device in a locked position.
Figure 5:
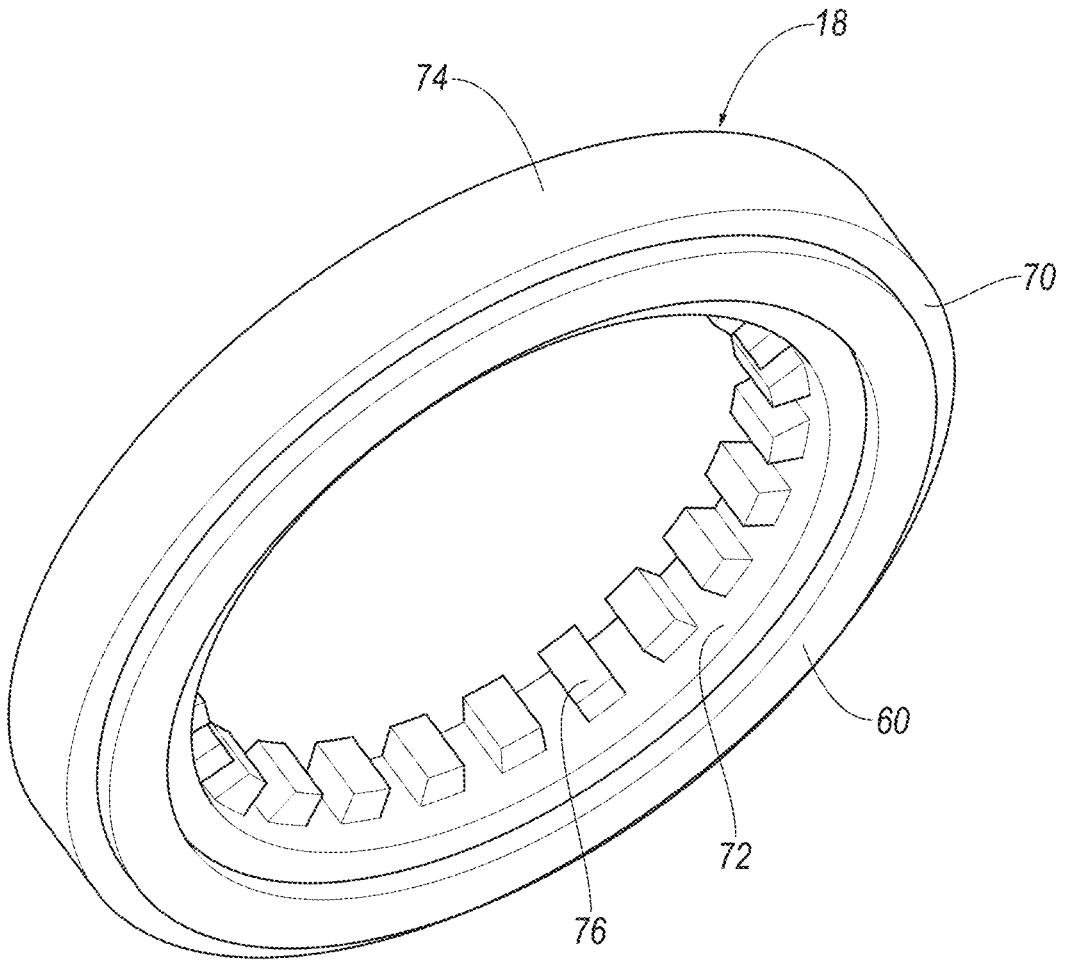
FIG. 5 is a perspective view of a ring of the seatbelt retractor and a friction pad adjacent the ring.
Figure 6:
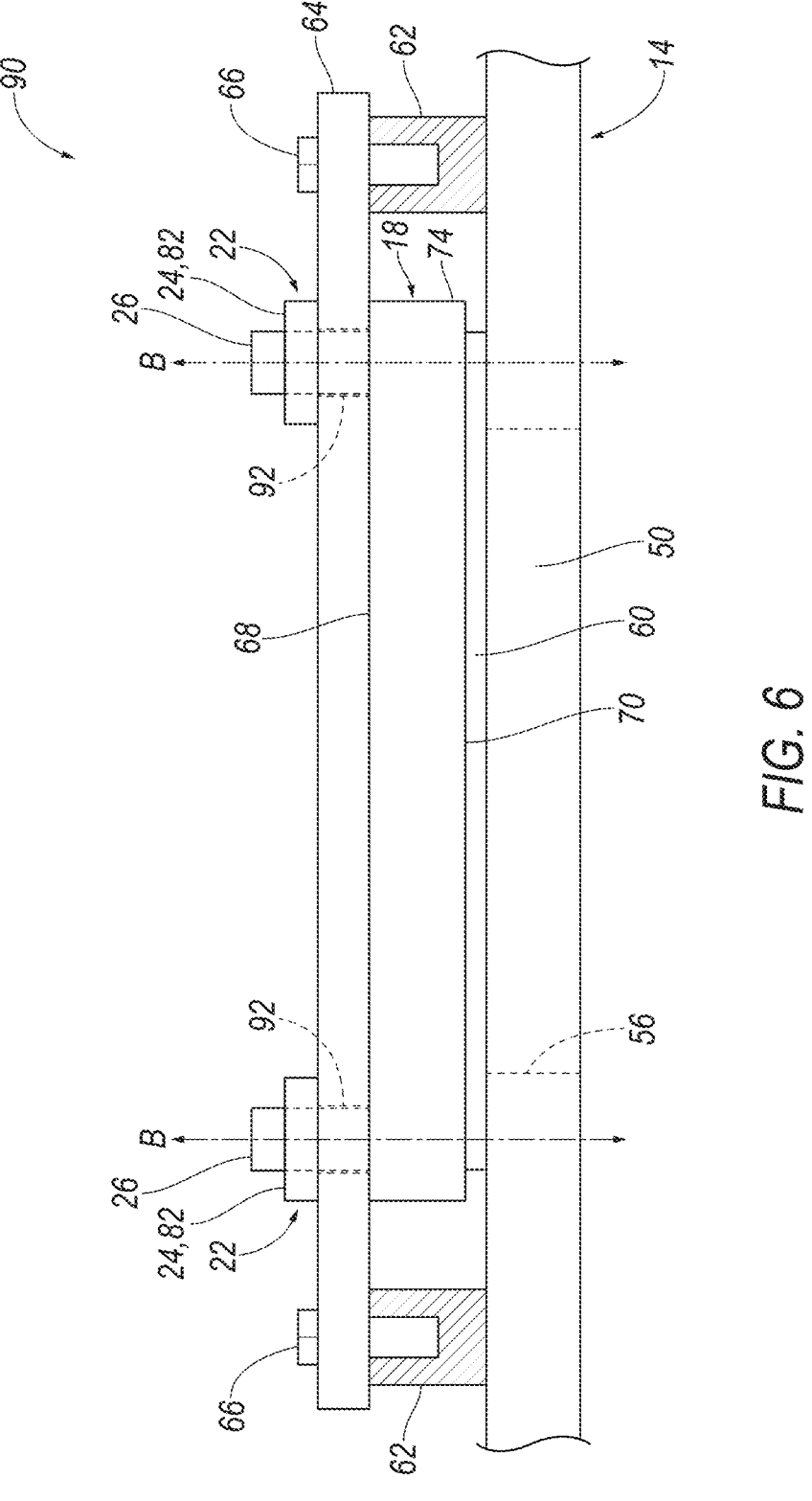
FIG. 6 is a partial cutaway and side view of the seatbelt retractor.

With reference to FIGS. 3 and 4, the ring 18 is selectively engageable with the spool 16. The spool 16 is rotatable relative to the ring 18 when the locking device 20 is unlocked, as described further below. When the locking device 20 is locked, the locking device 20 couples the spool 16 and the ring 18. As described further below, frictional force between the ring 18 and the frame 14, specifically the second plate 50 in the example shown in the Figures, is adjustably controlled by the linear actuator 22 to adjust the force threshold at which the ring 18 rotates relative to the frame 14 about the rotational axis A. The spool 16 and the ring 18 rotate together in unison relative to the frame 14 about the rotational axis A when rotational force applied by the spool 16 to the ring 18 exceeds the force threshold. The locking device 20 is releasably and selectively lockable to the ring 18 to selectively lock the spool 16, as described further below.

The frame 14 may include a second ring 62. As an example, the second ring 62 is fixed to the second plate 50, e.g., by threaded fastener, welding, adhesive, unitary formation, etc. The second ring 62 extends annularly about the ring 18. The second ring 62 is coaxial with the spool 16 on the rotational axis A. The second ring 62 may be annular about the opening 56, as shown in the example in the Figures.

The second ring 62 supports the linear actuators 22 on the frame 14, e.g., between a member 64 of the frame 14 and the second plate 50 of the frame 14. The member 64 may extend from one side of the second ring 62 to the other side of the second ring 62. As an example, the member 64 may extend across a diameter of the second ring 62, as shown in the example in the Figures. The ring 18 is between the member

64 and the second plate 50 of the frame 14. The locking device 20 is between the member 64 and the second plate 50 of the frame 14. The second ring 62 is between the member 64 and the second plate 50. The member 64 may be fixed to the second ring 62, e.g., by a pair of fasteners 66 as shown in the Figures. In other examples, the member 64 may be fixed to the second ring 62 in any suitable way, e.g., by welding, adhesive, unitary formation, etc.

The ring 18 is supported by the frame 14. Specifically, as described above, the ring 18 is supported by the frame 14 between the member 64 and the second plate 50 of the frame 14. The ring 18 includes a top surface 68 facing away from frame 14 and the ring 18 includes a bottom surface 70 facing toward the frame 14. Specifically, the top surface 68 faces away from the second plate 50 of the frame 14 and the bottom surface 70 faces toward the second plate 50 of the frame 14. The linear actuators 22, as described further below, may abut the top surface 68 of the ring 18 and the bottom surface 70 of the ring 18 may selectively engage the second plate 50 based on actuation of the linear actuators 22. As one example, a friction pad 60 may be between the bottom surface 70 and the second plate 50 to frictionally engage the ring 18 and the second plate 50, and in such examples, the bottom surface 70 of the ring 18 may abut the friction pad 60. For example, the friction pad 60 may be fixed to the bottom surface 70 to move as a unit with the bottom surface 70 when the ring 18 rotates relative to the frame 14 about the rotational axis A, or the friction pad 60 may be fixed to the second plate 50 so that the bottom surface 70 rotates relative to the friction pad 60 and the frame 14 about the rotational axis A. The linear actuator(s) 22 exert force on the top surface 68 of the ring 18 along the rotational axis A to engage frictionally engage the bottom surface 70 and the second plate 50, e.g., through the friction pad 60. The linear actuators(s) 22 adjust the force applied to the top surface 68 to adjust the force threshold at which the ring 18 rotates relative to the frame 14 about the rotational axis A. The inner diameter of the ring 18 may be greater than the diameter of the opening 56 of the second plate 50, as shown in the Figures.

The ring 18 includes an inner surface 72 extending annularly around the rotational axis A and an outer surface 74 extending annularly about the inner surface 72. In the example shown in the Figures, the inner surface 72 include teeth 76 and the locking device 20 includes teeth 78 that selectively engage the teeth 76 on the inner surface 72 of the ring 18. The outer surface 74 may face toward the second ring 62 of the frame 14. Specifically, the outer surface 74 may be completely surrounded by the second ring 62.

The ring 18 is selectively lockable with the spool 16. The locking device 20 is operatively coupled to the spool 16 and the ring 18 to rotationally engage the spool 16 with the ring 18 in the locked position and rotationally disengage the spool 16 from the ring 18 in the unlocked position. The locking device 20 engages the inner surface 72 of the ring 18. In the example shown in the Figures, the locking device 20 directly engages the ring 18 in the locked position. For example, the inner surface 72 includes teeth 76 and the locking device 20 includes teeth 78. In such examples, the teeth 78 of the locking device 20 are engaged with the teeth 76 of the inner surface 72 in the locked position and disengaged with the teeth 76 of the inner surface 72 in the unlocked position.

As shown in FIG. 2, the locking device 20 may be supported at the second end 54 of the spool 16 and the second plate 50 of the frame 14. The spool 16 may be between the return spring 58 and the locking device 20 along the rotational axis A. The locking device 20 is movable from the unlocked position, shown in FIG. 3, in which torque is not transferred from the spool 16 to the friction pad 60, to the locked position, shown in FIG. 4, in which torque is transferred from the spool 16 to the friction pad 60. Specifically, in the unlocked position, the spool 16 is free to rotate relative to the ring 18 about the rotational axis a and in the locked position the spool 16 rotates as a unit with the ring 18 relative to the frame 1460. The locking device 20 is supported by and anchored to the spool 16 and extends through the opening 56. The locking device 20 is aligned with the ring 18 along the rotational axis A. For example, in the example shown in the Figures, the teeth 78 of the locking device 20 are aligned with the teeth 76 of the ring 18 along the rotational axis A.

The locking device 20 may be lockable with the ring 18. Specifically, the locking device 20 is fixed to and rotates with the spool 16 when the locking device 20 is unlocked with the ring 18. When locked with the ring 18, the locking device 20 couples the ring 18 and the spool 16 so that the ring 18 and the spool 16 rotate together as a unit. The locking device 20 may include an inertia clutch that moves the locking device 20 from the unlocked position to the locked position in response to a vehicle deceleration. The inertia clutch may be supported by the spool 16 and lockable with the ring 18. For example, the inertia clutch may include one or more pawls 80 supported at the second end 54 of the spool 16. As an example, the inertia clutch may be a centrifugal clutch in which centrifugal force from an increase in rotation speed of the spool 16, e.g., when a certain load is applied to the webbing 28, may urge the pawls 80 radially outward to the locked position. As another example, the locking device 20 may be moved from the unlocked position to the locked position in response to deceleration of the vehicle 12, e.g., a sudden slowing of the vehicle 12, sudden stop, impact, etc. The locking device 20 may be moved from the unlocked position to the locked position in response to an activation sensor (not shown). The activation sensor senses sudden deceleration of the vehicle 12 and triggers activation of the locking device 20, i.e., moves the locking device 20 to the locked position. The locking device 20 may include any suitable structure for selectively transferring torque, e.g., including conventional structures. The locking device 20 is resettable. In other words, the locking device 20 may be unlocked from the ring 18, e.g., when the inertia clutch is released, to allow the spool 16 to rotate freely relative to the ring 18. The locking device 20 may be of the type known in the art including, in some examples, those used in emergency-locking retractors.

With reference to FIGS. 3-6, the friction pad 60 is aligned with the ring 18. Specifically, the friction pad 60 is aligned with the ring 18 between the ring 18 and the frame 14. In some examples, such as the example shown in the Figures, the friction pad 60 may be coaxial with the spool 16 on the rotational axis A. In other examples, such as when the ring 18 is not coaxial with the spool 16 along the rotational axis A, the friction pad 60 may not be coaxial with the spool 16 on the rotational axis A.

The friction pad 60 is between the frame 14 and the ring 18 and may abut the frame 14 and the ring 18. In other examples, intermediate components may be between the friction pad 60 and the frame 14 and/or between the friction pad 60 and the ring 18. The friction pad 60 is between the bottom surface 70 and the second plate 50 of the frame 14. In the example shown in the Figures, the friction pad 60 abuts the bottom surface 70 and the friction pad 60 abuts the second plate 50. The friction pad 60 is fixed to one of the ring 18 and the frame 14. For example, as shown in the example in the Figures, the friction pad 60 may be fixed to the bottom surface 70 of the ring 18 so that when the ring 18 and the friction pad 60 rotate as a unit about the rotational axis A when the locking device 20 is in the locked position. As another example, the friction pad 60 may be fixed to the frame 14 so that friction pad 60 remains stationary relative to the frame 14 when the ring 18 rotates about the rotational axis A.

In examples including the friction pad 60, the friction pad 60 creates friction between the ring 18 and the frame 14. The friction between the ring 18 and the frame 14 establishes the force threshold. As set forth above, movement of the linear actuator(s) 22 against the ring 18 axially along the rotational axis A adjusts the force threshold. When the rotational force from the spool 16 exceeds the force threshold, the ring 18 and the spool 16 rotate about the rotational axis A relative to the frame 14. In the example shown in the Figures, the friction pad 60 rotates with the ring 18 and slides along the second plate 50. The sliding of the friction pad 60 on the second plate 50, and the friction therebetween, controls the rotation of the spool 16 relative to the frame 14.

In the example shown in the Figures, the force threshold is the rotational force on the spool 16, caused by forces on the webbing 28, at which the frictional forces between the ring 18 and the frame 14 is overcome and the ring 18 rotates relative to the frame 14 about the rotational axis A. Specifically, in the example shown in the Figures, the force threshold is based on friction between the friction pad 60 and the frame 14. Specifically, in the example shown in the Figures, the force threshold is force of a magnitude that overcomes the friction between the friction pad 60 and the second plate 50. Once the force threshold is exceeded, the friction pad 60 may apply a kinetic friction force, e.g., by sliding along second plate 50.

The friction pad 60 may be of any suitable material that is a resilient, high friction elastomeric polymer, e.g., ethylene propylene diene rubber (EPBM), acrylonitrile-butadiene rubber (NBR), natural rubber (NR), fluorosilicone rubber (FVMQ), silicone rubber (VMQ), etc. Other examples of suitable materials may include friction materials used in automotive brakes, e.g., non-asbestos organic materials, semi-metallic materials, sintered metallic materials, or carbon composites. The friction pad 60 may be of any other suitable material.

With continued reference to FIGS. 3-6, the seatbelt retractor 10 includes one or more linear actuators 22. The example shown in the Figures includes a pair of linear actuators 22 spaced from each other. The seatbelt retractor 10 may include any suitable number of linear actuators 22. The ring 18 is biased toward and away from the frame 14 axially along the rotational axis A by the linear actuators 22. The linear actuators 22 may move along the rotational axis A to bias the ring 18 and friction pad 60 toward and away from the frame 14. In other words, the linear actuators 22 may apply pressure to the ring 18 along the rotational axis A. The linear actuator 22 increases pressure between the ring 18 and the second plate 50 along the rotational axis A when the linear actuator 22 moves toward the ring 18 and the linear actuator 22 decreases pressure between the ring 18 and the second plate 50 along the rotational axis A when the linear actuator 22 moves away from the ring 18. The operation of the linear actuator, specifically the movement of the linear actuator axially along the rotational axis A to adjust pressure applied between the ring 18 and the second plate 50 may be based on one or more factors, e.g., the size of an occupant of the seat, force magnitude and/or direction from certain vehicle impacts, magnitude of rotational forces on the spool 16, etc.

Each of the linear actuators 22 includes the base 24 and the pin 26 that is moveable relative to the base 24. The linear actuators 22 are fixed relative to frame 14, i.e., the member 64 of the frame 14. Specifically, the base 24 of the linear actuators 22 is fixed relative to the frame 14. The linear actuators 22 may be fixed to the member 64 of the frame 14 and spaced from each other along the member 64 of the frame 14. The base 24 of each linear actuator 22 is fixed to the member 64 of the frame 14. Each pin 26 is elongated along an axis B that extends along the rotational axis A.

The linear actuators 22 are fixed relative to the member 64 between the member 64 and the ring 18. Each of the linear actuators 22 is adjacent the top surface 68 of the ring 18. Specifically, the linear actuator 22 abuts the top surface 68 of the ring 18. The pin 26 of the linear actuator 22 may abut the top surface 68 of the ring 18. The pin 26 of each of the linear actuators 22 may extend through the member 64 to the top surface 68 of the ring 18. The pins 26 may extend along the axis B through the member 64 to the ring 18. In other words, the member 64 may include one or more holes 92 aligned with the linear actuators 22 such that the pins 26 may be received by and extending through the holes 92. The pin 26 of each linear actuator 22 is moveable relative to the member 64 of the frame 14. Each of the pins 26 is moveable relative to the base 24 and the frame 14 toward and away from the ring 18 along the rotational axis A. As the pins 26 abut the ring 18, the ring 18 is biaseable toward and away from the frame 14 by the pins 26 of the linear actuators 22. In other words, the pins 26 may apply pressure against the ring 18 to bias the ring 18 either toward or away from the frame 14.

The base 24 of the linear actuator 22 may include or be coupled to a motor 82 to move the pin 26. The motor 82 may be any suitable type of motor 82 to move the pin 26 toward or away from the ring 18. The pin 26 may be of any suitable type. For example, the pin 26 may be a lead screw, ball screw, roller screw, etc., that is rotatable by the motor 82 to move toward or away from the ring 18. In other examples, the pin 26 may slide relative to the base 24 and be pushed and/or pulled by the motor 82. In other examples, the linear actuator 22 may be of any suitable type, including solenoids, cams, etc.

As set forth above, the friction pad 60 may be biased toward or away from the frame 14 by the linear actuators 22. The linear actuators 22 activate when the rotational force on the spool 16 exceeds the force threshold. Any pressure applied by the linear actuators 22 creates a friction force between the friction pad 60 and one of the frame 14 and the ring 18 that is greater than the force threshold. The force threshold is designed to selectively prevent rotation of the ring 18 relative to the frame 14, and thus prevent rotation of the ring 18 relative to the frame 14, to control the kinematics of an occupant and to selectively allow rotation of the ring 18 relative to the frame 14 to control payout of the webbing 28. Thus, payout of the webbing 28 from the seatbelt retractor 10 limits chest compression of the occupant. The force threshold may be based on, for example, the dimensions and geometry of the friction pad 60, the material type of the friction pad 60, etc. The force threshold has a magnitude above zero. The force threshold may be empirically calculated.

The linear actuators 22 may apply constant pressure or variable pressure to the ring 18 to change the pressure of the friction pad 60. The greater the pressure, the lessor the payout of webbing 28 by the spool 16. The lessor the pressure, the greater the payout of webbing 28 by the spool 16. In other words, the ring 18 and locking device 20 may rotate about the rotational axis A by a greater degree when the pressure is lessor and the ring 18 and the locking device 20 may rotate about the rotational axis A by a lesser degree when the pressure is greater. The linear actuators 22 may vary the pressure over a period of time to allow for progressive or digressive loading. In other words, over time, the pressure from the linear actuators 22 may increase or decrease, i.e., variable pressure, depending on design parameters, e.g., occupant size, number of rotations of the spool 16, whether the seatbelt retractor is used for a front seat or a rear seat, etc., of the seatbelt retractor 10. Variable pressure to the ring 18 may include, for example, higher pressure that decreases over a period of time and lower pressure that increases over a period of time. The variation in pressure may have a linear slope, a non-linear slope, a step change, etc. The seatbelt retractor 10 as described herein may be used at any suitable seating location of the vehicle 12, e.g., a rear seat, a front seat, etc.

The vehicle 12 may include a plurality of sensors 84, 94, 96 in communication with a vehicle computer 86 that may measure or identify rotational force data, occupant data, or certain vehicle impact data, e.g., a spool sensor 84, an impact sensor 94, an occupancy sensor 96, etc.

As one example, the spool sensor 84 may be coupled to the spool 16 that may measure or identify the rotational force on the spool 16. Such a spool sensor 84 may be in communication with the vehicle computer 86 to activate the linear actuators 22 in response to identified rotational forces.

As another example, the vehicle 12 may include at least one impact sensor 94 for sensing certain vehicle impacts (e.g., impacts of a certain magnitude, direction, etc.). The impact sensor 94 may be configured to sense certain vehicle impacts prior to impact, i.e., pre-impact sensing. The impact sensor 94 may be in communication with the vehicle computer 86. The impact sensor 94 is configured to detect certain vehicle impacts. In other words, a "certain vehicle impact" is an impact of the type and/or magnitude of impact to the vehicle 12, i.e., "certain" indicates the type and/or magnitude of the impact. The type and/or magnitude of such "certain vehicle impacts" may be prestored in the vehicle computer 86, e.g., a restraints control module and/or a body control module. The impact sensor 94 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor 94 may be located at numerous points in or on the vehicle 12. Detection of certain vehicle impacts by the impact sensor 94 may be used in activation of the linear actuators 22 to apply pressure to the ring 18 and the friction pad 60.

As yet another example, the vehicle 12 may include one or more occupancy sensor 96. The occupancy sensor 96 is configured to detect occupancy of the seats 30, e.g., detect an occupant of the seat 30. The occupancy sensor 96 may be visible-light or infrared cameras directed at the seat 30, weight sensors supported by the seat bottom 34, sensors detecting whether the latch plate 40 is engaged with the seatbelt buckle 42, or other suitable sensors. The occupancy sensor 96 provides data to the vehicle computer 86 specifying whether the seat 30 is occupied or unoccupied and information regarding the type of occupant. As one example, the vehicle 12 may include one occupancy sensor 96 for each seat 30. As another example, the vehicle 12 may include one occupancy sensor 96 that is designed to individually detect occupancy of each seat 30. Information detected by the occupancy sensor 96 may be used to determine how much friction should be applied by the friction pad 60 by the linear actuators 22.

Once the rotation of the ring 18 and the spool 16 relative to the frame 14 ceases and the seatbelt retractor 10 returns to the design position, e.g., by detection of the spool sensor 84, detection by the impact sensors, and/or detection of the occupancy sensor 96, the linear actuators 22 may move away from the ring 18 to decrease pressure on the ring 18 and the friction pad 60. Thus, the seatbelt retractor 10, specifically the load limiter 90, is resettable to the design position. In other words, the seatbelt retractor 10 is reusable after force above force threshold is applied to the webbing 28 and a discrete amount of rotation of the ring 18 and the spool 16 pays out a discrete amount of webbing 28 from the spool 16.

Figure 7:
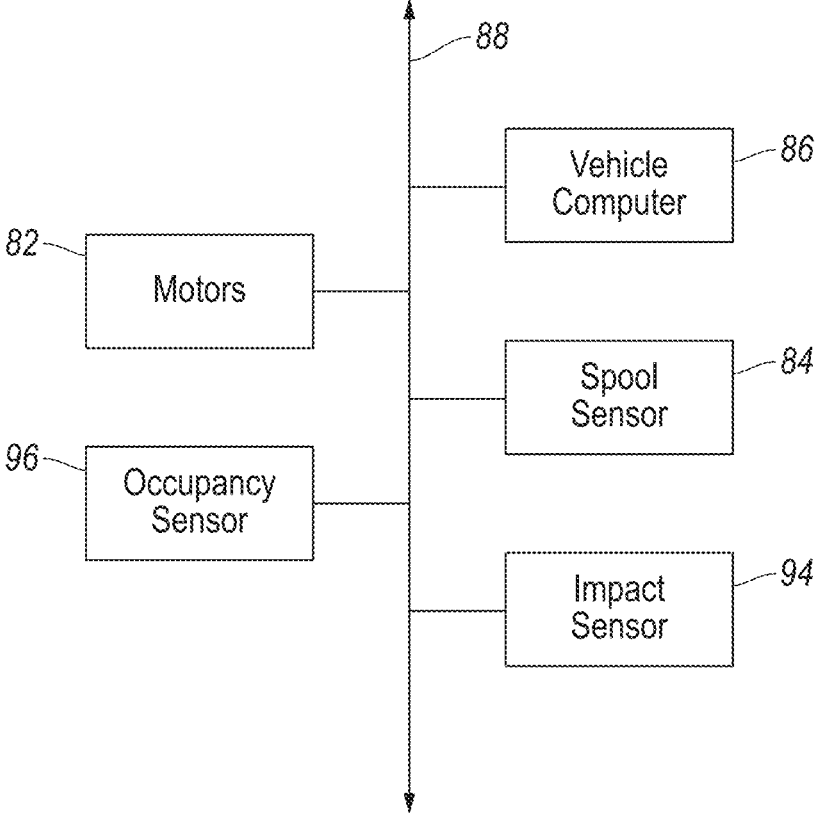
FIG. 7 is a block diagram of a vehicle communication network of the vehicle.

With reference to FIG. 7, the vehicle computer 86 includes a processor and a memory storing instructions executable by the processor. The memory includes one or more forms of computer readable media, and stores instructions executable by the vehicle computer 86 for performing various operations, including as disclosed herein. The vehicle computer 86 may be a restraints control module. The vehicle computer 86 can be a generic computer with the processor and the memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the vehicle computer 86 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 86.

The vehicle computer 86 is generally arranged for communications on a vehicle communication network 88 that can include a bus in the vehicle 12 such as a controller area network CAN or the like, and/or other wired and/or wireless mechanisms. Alternatively or additionally, in cases where the vehicle computer 86 actually comprises a plurality of devices, the vehicle communication network 88 may be used for communications between devices represented as the vehicle computer 86 in this disclosure. Further, as mentioned below, various controllers and/or sensors may provide data to the vehicle computer 86 via the vehicle communication network 88.

The disclosure has been described in an illustrative manner, and it is to be understood that the terminology which has been used is intended to be in the nature of words of description rather than of limitation. The numerical adjectives "first" and "second" are used herein merely as identifiers and do not signify order or importance. Many modifications and variations of the present disclosure are possible in light of the above teachings, and the disclosure may be practiced otherwise than as specifically described.

What is claimed is:

1. A seatbelt retractor comprising:
   a frame;
   a spool rotatably supported by the frame and having a rotational axis;
   a ring selectively lockable with the spool;
   a locking device operatively coupled between the spool and the ring to rotationally engage the spool with the ring in a locked position and rotationally disengage the spool from the ring in an unlocked position; and
   a linear actuator having a base and a pin, the base being fixed relative to the frame and the pin being moveable relative to the base and the frame toward and away from the ring along the rotational axis.

2. The seatbelt retractor of claim 1, further comprising a friction pad aligned with the ring, the friction pad being between the ring and the frame.

3. The seatbelt retractor of claim 2, wherein the friction pad abuts the frame and the friction pad abuts the ring.

4. The seatbelt retractor of claim 2, wherein the ring includes a top surface facing away from frame and the ring includes a bottom surface facing toward the frame, the linear actuator being adjacent the top surface and the friction pad being adjacent the bottom surface between the bottom surface and the frame.

5. The seatbelt retractor of claim 1, further comprising a second linear actuator having a base and a pin, the base of the second linear actuator being fixed relative to the frame and the pin of the second linear actuator being moveable relative to the base and the frame toward and away from the ring along the rotational axis.

6. The seatbelt retractor of claim 5, wherein the frame includes a member, the linear actuator and the second linear actuator being spaced from each other along the member.

7. The seatbelt retractor of claim 6, wherein the pin of the linear actuator and the pin of the second linear actuator each extend through the member along the rotational axis to the ring.

8. The seatbelt retractor of claim 1, wherein the ring is biaseable toward and away from the frame by the pin along the rotational axis.

9. The seatbelt retractor of claim 1, wherein the frame includes a second ring coaxial with the spool on the rotational axis, the second ring extending annularly about the ring.

10. The seatbelt retractor of claim 9, wherein the frame includes a member fixed to the second ring, the linear actuator being fixed relative to the member between the member and the ring.

11. The seatbelt retractor of claim 1, wherein the frame includes a member, the linear actuator being fixed relative to the member between the member and the ring.

12. The seatbelt retractor of claim 11, wherein the pin of the linear actuator each extend through the member along the rotational axis to the ring.

13. The seatbelt retractor of claim 1, wherein:
   the ring includes an inner surface extending annularly around the rotational axis and an outer surface extending annularly about the inner surface; and
   the locking device engages the inner surface.

14. The seatbelt retractor of claim 13, wherein the inner surface includes teeth and the locking device includes teeth, the teeth of the locking device being engaged with the teeth of the inner surface in the locked position and disengaged with the teeth of the inner surface in the unlocked position.

15. The seatbelt retractor of claim 14, wherein the locking device is a centrifugal clutch.

16. The seatbelt retractor of claim 1, wherein the locking device includes an inertia clutch.

17. The seatbelt retractor of claim 1, wherein the locking device directly engages the ring in the locked position.

* * * * *